UNITED STATES PATENT OFFICE 2,520,656

$\Delta^{5,6}$-3-HYDROXYSTEROID AND DERIVATIVES THEREOF

Tadeus Reichstein, Basel, Switzerland, assignor to N. V. Organon, Oss, Netherlands, a Dutch limited liability company No Drawing. Application April 5, 1946, Serial No. 659,866. In Switzerland March 2, 1946

8 Claims. (Cl. 260—397.1)

Regarding the constitution of steroid hormones as a criterion, the presence of an $\alpha:\beta$-unsaturated keto grouping in ring A appears to be prerequisite to good activity. In the constructive synthesis of such hormones, particularly of those with cortin activity, the starting materials have heretofore generally been the relatively readily available 3-hydroxy steroids with saturated rings A and B. Under these circumstances, the formation of the $\Delta^{4,5}$-3-keto-grouping took place only at the end of the synthesis by oxidation of the 3-hydroxyl group, halogenation in $\alpha$-position to the thus-obtained new keto group and subsequent dehydrohalogenation. However, this method of introducing a double bond gives tenable yields only in rare cases. Many planned syntheses collapse entirely at this last stage, since mixtures are obtained which are only difficultly separable. It is therefore more expedient to use the corresponding $\Delta^{5,6}$-3-hydroxy compounds as starting materials. These already contain, at the beginning of the synthesis, a double bond which can be shifted to the desired position simultaneously with the oxidation of the 3-hydroxyl group. However, in many cases, and particularly in the bile acid series, the preparation of such compounds has been found to be very difficult. For these reasons, a process for the preparation of $\Delta^{5,6}$-3-hydroxy steroids with good yield in controllable manner, represents a substantial step forward in the art.

The present invention relates to a process for the preparation of $\Delta^{5,6}$-3-hydroxy steroids and derivatives thereof. According to this invention, steroids which are saturated in rings A and B and which contain a free or substituted hydroxyl group in 3- and in 6-position, are treated with means for splitting off the substituent in 6-position with formation of a double bond. The resultant products may then be reacted with hydrolyzing and/or esterifying or etherifying agents.

The starting materials may be of any desired steric configuration. They may contain in 17-position a side-chain and also, externally of rings A and B, e. g. in the positions 11, 12 and/or 17 or in the side-chain, additional substituents such as free or substituted carbonyl, hydroxyl or carboxyl groups. Thus for example use may be made of androstane-3,6,17-triols or -3,6-diol-17-ones, androstane-3,6,17-triol-11-ones or -12-ones, androstane-3,6,12,17-tetroles and analogous compounds which contain in 17-position a saturated or unsaturated hydrocarbon radical which may be substituted, for example an alkyl, alkenyl, alkinyl radical such as for instance as methyl, vinyl, ethinyl or any desired sterol side-chain; pregnane-3,6-diol-20-ones, pregnane-3,6-diol-11,20-diones or -12,20-diones, pregnane-3,6,12-triol-20-ones; 3,6-dihydroxy-11-keto-, 3,6-dihydroxy-12-keto-, 3,6-11-trihydroxy- or 3,6,12-trihydroxycholanic acids, -nor-cholanic acids, -bisnor-cholanic acids or -etio-cholanic acids; also corresponding compounds which are unsaturated in ring C. Instead of the aforenamed compounds, use may also advantageously be made of derivatives thereof which may be substituted completely or partly in the hydroxyl and/or acid groups, the hydroxyl groups being esterified for instance with carboxylic acids such as acetic, propionic, succinic or benzoic acid, with sulfonic acids such as methane sulfonic acid or p-toluene sulfonic acid, with hydrohalogen acids or xanthic acids, or being etherified with suitable alcohols or phenols.

Insofar as the starting materials are not already known, they may be prepared for instance analogously to the cholestane-3,6-diol described by Plattner and Lang in Helv. 27, 1872 (1944) starting from $\Delta^{4,5}$-cholestene-3-one via the corresponding enol acetate (prepared for example according to the data of Westphal, B. 70, 2128 [1937]), the $\Delta^{4,5}$-6-bromocholestene-3-one (see Inhoffen, B. 69, 2141 [1936], and also Westphal, B. 70, 2128 [1937], and the cholestane-3,6-dione (Dane, Wang and Schulter, Z, physiol. Ch. 245, 80 [1936]). The ultimate starting materials of the present process are thus $\Delta^{4,5}$-3-keto steroids. Their conversion into the above-named starting compounds in combination with the claimed manipulations represent the only practicable way thus far developed for transforming them into the corresponding $\Delta^{5,6}$-3-hydroxy compounds. As is known, direct reduction of the keto group leads only to $\Delta^{4,5}$-3-hydroxy compounds and attempts to shift the double bond into the 5,6-position have heretofore resulted only in the splitting off of the 3-hydroxy group (see Schoenheimer and Evans, J. biol. Chem. 114, 567 [1936]).

The splitting off of the substituent present in 6-position may be effected, with formation of a 5,6-double bond, in case the said substituent is a free hydroxyl group, by the action of a mineral acid, e. g. hydrochloric acid in alcohol, and also by means of phosphorus oxychloride in pyridine; also by means of a carboxylic acid salt such as silver acetate or potassium acetate, and the like. This substituent, in the form of an esterified hydroxyl group, may also be split off with the last-enumerated agents. The operation may also advantageously be carried out at elevated temperature and/or reduced pressure, if necessary in the presence of inert gases.

Such substituted hydroxyl or carboxyl groups as may be present may, if desired, be converted into free hydroxyl or carboxyl groups, with the aid of hydrolyzing agents.

The resultant $\Delta^{5,6}$-3-hydroxy steroids may, on the other hand, be converted into their esters and/or ethers.

The products are useful as intermediates for the preparation of highly active steroid hormones.

The following examples illustrate the invention, the parts being by weight:

Example 1

7.1 parts of cholestane-3β,6β-diol of melting point 189–190° C. (see Plattner and Lang, Helv. 27, 1872 [1944]) are boiled for 3 hours with 5 parts of alcohol and 75 parts of conc. hydrochloric acid. After addition of a large amount of water, extraction with ether is effected, the ether solution washed neutral, dried and evaporated. The residue is heated with 2 parts of pyridine and 2 parts of acetic anhydride for 1 hour on the water bath and is chromatographed over aluminum oxide. The fractions washed with petroleum ether give, from ether-methanol, cholesteryl-acetate of melting point 111–114° C., which for purposes of characterization may be converted into the dibromide. Recrystallized from ether-methanol, needles of melting point 112–114° C. are obtained.

The splitting off of water may also be effected with alcohol and sulfuric acid or with a mixture of glacial acetic acid and hydrochloric acid (4:1).

Example 2

12 parts of cholestane-3β,6β-diol-3-monoacetate of melting point 142–143° C. (see Plattner and Lang, Helv. 27, 1872 [1944]) are dissolved in 100 parts of pyridine, 40 parts of phosphorus oxychloride added, and allowed to stand for 22 hours at room temperature with exclusion of moisture. Ether and water are added to the reaction mixture, the resultant mixture shaken out, the ether solution washed with hydrochloric acid, soda solution and water, dried and evaporated. In this way, 11.3 parts of cholesteryl-acetate are obtained, which after recrystallization from ether-methanol melts at 113–114.5° C.

Example 3

5 parts of cholestane-3β,6β-diol-dimesylate of melting point 130–131° C. (obtained from cholestane-3β,6β-diol by the action of mesyl chloride in pyridine solution at 0° C.) are boiled for 30 minutes with 5 parts of silver acetate in 200 parts of glacial acetic acid. After evaporation in vacuo, the residue is taken up in ether, the solution washed neutral, dried and evaporated. 3.85 parts of crude product are obtained, which are heated 2 hours at 50–60° C. with 5 parts of pyridine and 5 parts of acetic anhydride. After recrystallization from alcohol, 1.9 parts of cholesteryl-acetate of melting point 114–115° C. are obtained. The mother liquor (1.95 parts) yields, chromatographed on aluminum oxide, an additional 0.6 part.

Instead of silver acetate, use may also be made of potassium acetate.

Example 4

10 parts of cholestane-3β,6β-diol-3-mono-succinic acid-methylester of melting point 127–128° C. (obtained from cholestane-3β,6β-diol by heating with succinic anhydride in pyridine followed by treatment with diazomethane) are treated, in solution in 100 parts of pyridine, with 40 parts of phosphorus oxychloride. After standing for a considerable time, it is finally heated for 2 hours at 60–70° C. Further manipulation according to the preceding examples yields 8.8 parts of crude product from which, by recrystallization from ether-methanol and working-up of the mother liquors, 6.9 parts of pure cholesteryl-succinic acid methylester of melting point 100–101° C. are obtained.

Example 5

5.4 parts of cholestane-3β,6β-diol-3-succinic acid-methylester-6-mesylate of melting point 75–76° C. (obtained from the cholestane-3β,6β-diol-3-mono-succinic acid-methylester described in Example 4 by the action of mesyl chloride in pyridine at 0° C.) are fused in vacuo in a bomb-tube with 50 parts of pyridine and heated 20 hours at 135° C. (boiling xylol). The reaction mixture is taken up in ether, the solution washed neutral, dried and evaporated. The resultant 3.8 parts of crude product yield, recrystallized from methanol, 2.2 parts of cholesteryl-succinic acid-methylester of melting point 100–101° C.

Example 6

11 parts of 3β-acetoxy-6β-hydroxy-etio-allo-cholanic acid-methylester of melting point 161–163° C. (obtained from the $\Delta^{4,5}$-3-keto-etio-cholenic acid-methylester of melting point 130–131° C., described by Steiger and Reichstein in Helv. 20, 1040 [1937], first by preparation of the enol acetate of melting point 130–131° C., bromination by means of N-bromacetamide to $\Delta^{4,5}$-3-keto-6-bromo-etio-cholenic acid-methylester of melting point 139–140° C. which by treatment with hydrochloric acid in methanol can be converted into the 3,6-diketo-etio-allo-cholanic acid-methylester of melting point 251–253° C.; subsequent hydrogenation with platinum oxide in glacial acetic acid, gives the 3β,6β-dihydroxy-etio-allo-cholanic acid-methylester of melting point 227–231° C. which may then be partially acetylated) are dissolved in 100 parts of pyridine, treated with 40 parts of phosphorus oxychloride and, after standing for a considerable period of time at room temperature, heated for 2 hours at 50–60° C. The reaction mixture is taken up in ether and water, thoroughly shaken, the ether solution washed neutral, dried and evaporated. 14 parts of the resulting crude product are chromatographed over aluminum oxide, it being possible with benzol-petroleum ether mixtures to wash out 1.9 parts of $\Delta^{5,6}$-3β-acetoxy-etio-cholenic acid-methylester of melting point 152–155° C. Saponification of the acetoxy group leads to the $\Delta^{5,6}$-3β-hydroxy-etio-cholenic acid-methylester of melting point 187–189° C.

Example 7

14.8 parts of 3β, 6β-dihydroxy-etio-allo-cholanic acid-methylester-dimesylate (obtained by the treatment of the 3β, 6β-dihydroxy-etio-allo-cholanic acid-methylester of melting point 227–231° C., described in Example 6, with mesyl chloride in pyridine) are boiled for one hour with 15 parts of silver acetate in 500 parts of glacial acetic acid. The reaction mixture is evaporated, the residue taken up in ether, the ether solution filtered, washed neutral, dried and evaporated. By sublimation in high vacuum at 180° C. followed by purification over aluminum oxide, the residue yields 4.7 parts of $\Delta^{5,6}$-$3\beta$-acetoxy-etiocholenic acid-methylester which, recrystallized from ether-petroleum ether, melts at 152–155° C.

*Example 8*

8 parts of $3\beta,6\beta$-dihydroxy-etio-allo-cholanic acid-methylester-3-monosuccinic acid - methylester of melting point 202–205° C. (obtained by heating the free dihydroxy ester of melting point 227–231° C. with succinic anhydride in pyridine, followed by methylation with diazomethane) are treated, in solution in 100 parts of pyridine, with 40 parts of phosphorus oxychloride and the mixture allowed to stand over night at room temperature and then heated for 2 hours at 60–70° C. In this way, 8.8 parts of an oily crude product are obtained which may be sublimated at 200–210° C. in high vacuum. The resultant $\Delta^{5,6}$-$3\beta$-hydroxy-etio-cholenic acid-methylestersuccinic acid-methylester, recrystallized from methanol, melts at 104–105° C. Yield 6.3 parts.

The same product may be obtained while starting from $3\beta,6\beta$-dihydroxy-etio-allo-cholanic acidmethylester - 3 - succinic acid - methylester-6-mesylate of melting point 140–142° C. (obtained by treatment of the above-mentioned $3\beta,6\beta$-dihydroxy-etio-allo-cholanic acid-methylester-3-monosuccinic acid-methylester with mesyl chloride in pyridine at 0° C.) by heating with pyridine at 135° C. in an evacuated tube.

*Example 9*

31 parts of $3\beta$,-succinoxy-$6\beta$-hydroxy-11-ketoetio-allo-cholanic-dimethylester of melting point 225–231° C. (obtained from the known $\Delta^{4,5}$-3, 11-diketo - etio - cholenic - methylester of melting point 176–178° C. via the $\Delta^{3,4,5,6}$-3-acetoxy-11-keto-etio-choladienic acid-methylester of melting point 164–165° C., the $\Delta^{4,5}$-6-bromo-3,11-diketo-etio-cholenic acid-methylester of melting point 125–126° C. and, then, the 3,6,11-triketo-etio-allo-cholanic acid-methylester of melting point 236–238° C.; this compound is then hydrogenated to the $3\beta,6\beta,11\beta$-trihydroxy-etio-allo-cholanic acid-methylester of melting point 234–238° C. which, by partial acetylation followed by oxidation with chromic acid, may be converted into the $3\beta,6\beta$-diacetoxy-11-keto-etio-allo-cholanic acid-methylester of melting point 184–185° C.; the latter is saponified with potassium hydroxide in methanol to the $3\beta,6\beta$-dihydroxy-11-keto-etio-allo-cholanic acid-methylester of melting point 231–232° C., and finally esterification is effected with succinic anhydride in pyridine at 100° C. and with diazo-methane) are treated with 120 parts of pure phosphorus oxychloride in 350 parts of absolute pyridine and heated for 1 hour to 45° C. The reaction mixture is evaporated in vacuo at 40° C., a little water is added to the residue which is then shaken out with chloroform and ether. The extracts are washed once with a little dilute hydrochloric acid and with potassium bicarbonate solution, then with a little water, dried over a little sodium sulphate and evaporated. The amorphous residue (35.8 parts) may be distilled at 0.01 mm. pressure and 190–210° C. bath temperature. The distillate (30.7 parts) is $\Delta^{5,6}$-3-succinoxy-11-keto-etio-cholenic acid-dimethylester which, recrystallized from a small quantity of ether, melts at 118–119° C.

To saponify the esterified groups, 21 parts of this compound are refluxed for 3 hours with 40 parts of potassium hydroxide in 400 parts of methanol. 200 parts of water are added, the methanol is evaporated in vacuo, and the material twice extracted with ether. The alkaline-aqueous phase is then treated dropwise with conc. hydrochloric acid until there is a congo-acid reaction and the resultant precipitate is suction filtered, repeatedly washed with water and dried in vacuo. In this way there is obtained the free $\Delta^{5,6}$-$3\beta$-hydroxy-11-keto-etio-cholenic acid. Recrystallized from dioxane-ether, it forms shining granules of melting point 249–250° C. By acetylation with acetic anhydride in pyridine, there is obtained the $\Delta^{5,6}$-$3\beta$-acetoxy-11-keto-etio-cholenic acid of melting point 214–219° C.; on the other hand, by the action of diazomethane, the $\Delta^{5,6}$-3-hydroxy-11-keto - etio - cholenic acid-methylester may be obtained. Moreover, by treatment with etherifying agents it is possible to obtain for example the corresponding 3-alkoxy compounds.

Having thus disclosed the invention, what is claimed is:

1. A process for the manufacture of a 5,6-unsaturated compound of the cyclopentanopolyhydrophenanthrene series substituted in the 3-position by a member selected from the class consisting of free and esterified hydroxyl groups, by eliminating from a compound of the said series which is substituted in each of the positions 3 and 6 by a member selected from the class consisting of free and esterified hydroxyl groups only the substituent in the 6-position with formation of a double bond and without eliminating the substituent in the 3-position, which comprises subjecting the starting compound to the action of heat, whereby the 6-substituent is selectively eliminated and a 5,6-double bond formed.

2. A process for the manufacture of a 5,6-unsaturated compound of the cyclopentanopolyhydrophenanthrene series substituted in the 3-position by a member selected from the class consisting of free and esterified hydroxyl groups, by eliminating from a compound of the said series which is substituted in each of the positions 3 and 6 by a member selected from the class consisting of free and esterified hydroxyl groups only the substituent in the 6-position with formation of a double bond and without eliminating the substituent in the 3-position, which comprises subjecting the starting compound to the action of heat in the presence of hydrochloric acid.

3. A process for the manufacture of a 5,6-unsaturated compound of the cyclopentanopolyhydrophenanthrene series substituted in the 3-position by a member selected from the class consisting of free and esterified hydroxyl groups, by eliminating from a compound of the said series which is substituted in each of the positions 3 and 6 by a member selected from the class consisting of free and esterifed hydroxyl groups only the substituent in the 6-position with formation of a double bond and without eliminating the substituent in the 3-position, which comprises subjecting the starting compound to the action of heat in the presence of phosphorus oxychloride and of pyridine.

4. A process for the manufacture of a 5,6-unsaturated compound of the cyclopentanopolyhydrophenanthrene series substituted in the 3-position by a member selected from the class consisting of free and esterified hydroxyl groups, by eliminating from a compound of the said series which is substituted in each of the positions 3 and 6 by a member selected from the class consisting of free and esterified hydroxyl groups only the substituent in the 6-position with formation of a double bond and without eliminating the substituent in the 3-position, which comprises subjecting the starting compound to the action of heat in the presence of silver acetate and of glacial acetic acid.

5. The 5,6-unsaturated etiocholenic acids, substituted in 3-position by a member selected from the class consisting of free hydroxyl and hydroxyl esterified with a lower aliphatic carboxylic acid, and in 11-position by a keto group.

6. The 5,6-unsaturated 11-keto compounds of the cyclopentanopolyhydrophenanthrene series substituted in the 3-position by a member selected from the class consisting of free hydroxyl and hydroxyl esterified with a lower aliphatic carboxylic acid, and in the 17-position by a member selected from the class consisting of carboxy and carbalkoxy groups.

7. The $\Delta^{5,6}$-3-hydroxy-11-keto-etiocholenic acid.

8. The $\Delta^{5,6}$-3-acetoxy-11-keto-etiocholenic acid methyl ester.

TADEUS REICHSTEIN.

REFERENCES CITED

The following references are of record in the file of this patent:

UNITED STATES PATENTS

| Number | Name | Date |
| --- | --- | --- |
| 2,366,204 | Marker | Jan. 2, 1945 |